May 15, 1923.
C. G. ALLGRUNN
CROP DUSTING MACHINE
Filed Oct. 25, 1921
1,455,561
2 Sheets-Sheet 1
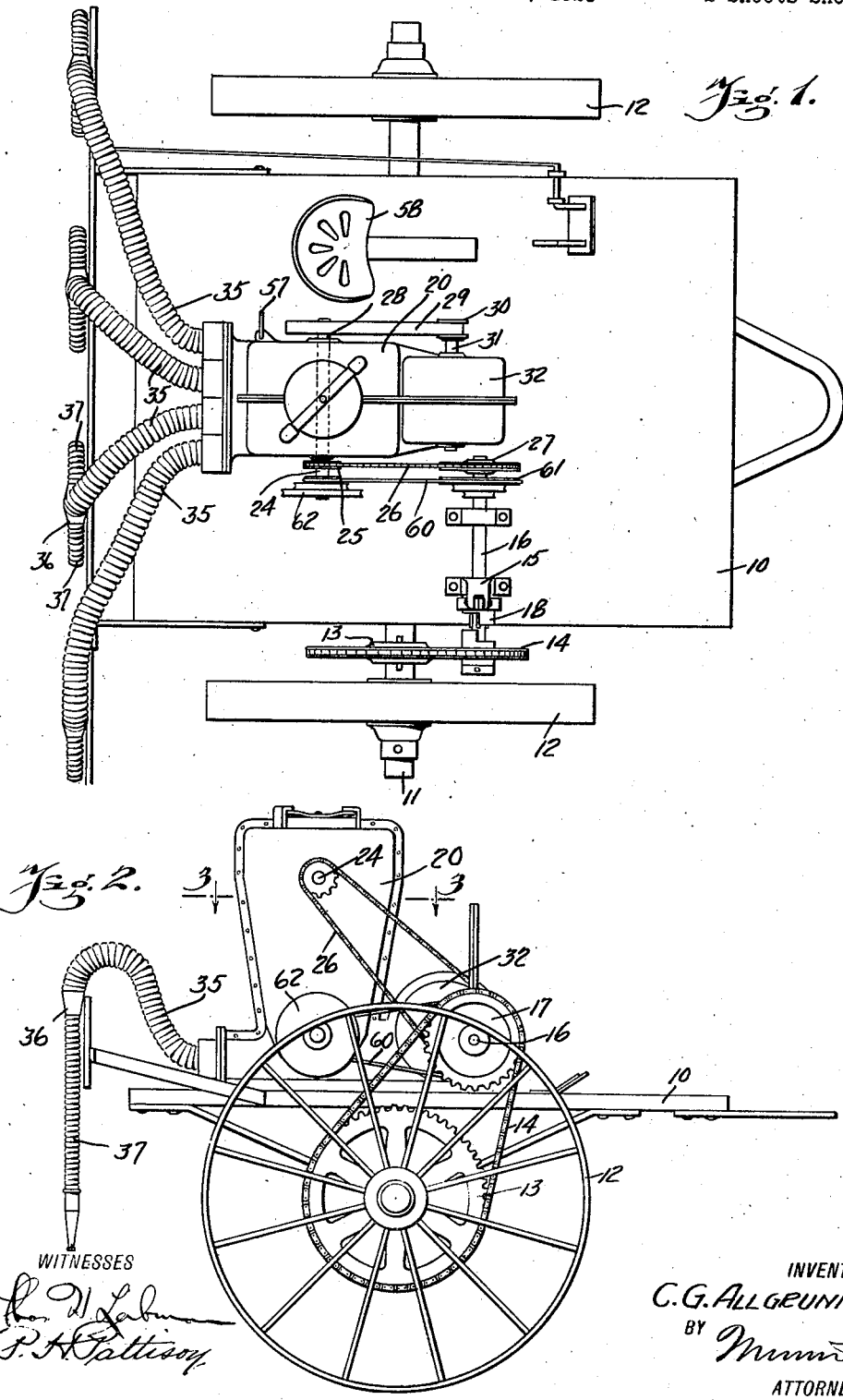
WITNESSES
INVENTOR
C. G. ALLGRUNN
BY
ATTORNEYS May 15, 1923.                                    1,455,561
C. G. ALLGRUNN
CROP DUSTING MACHINE
Filed Oct. 25, 1921                2 Sheets-Sheet 2
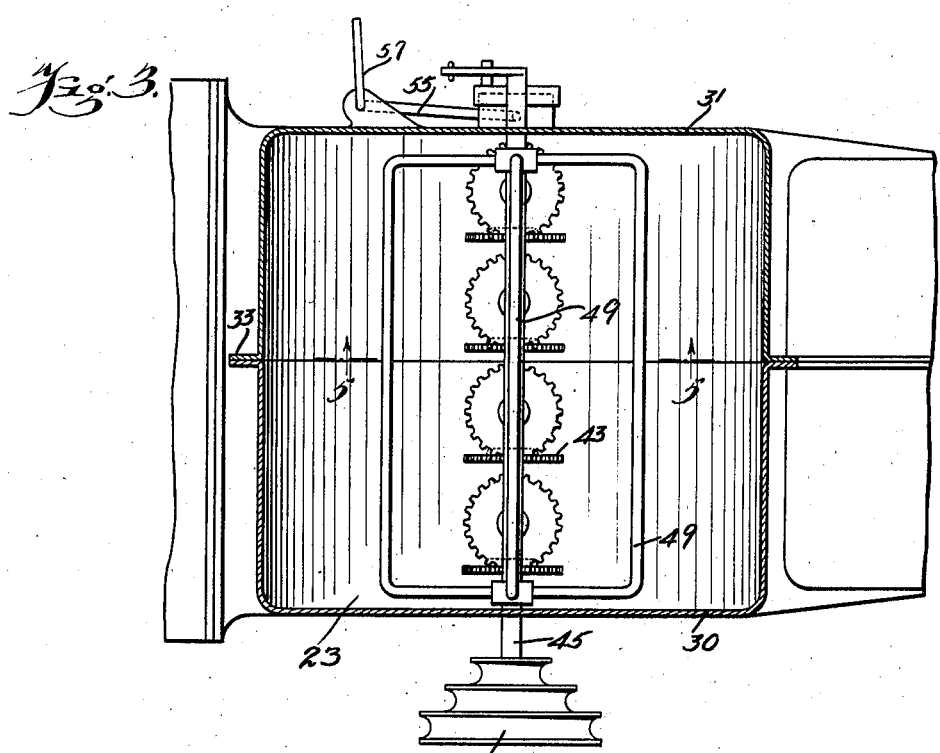
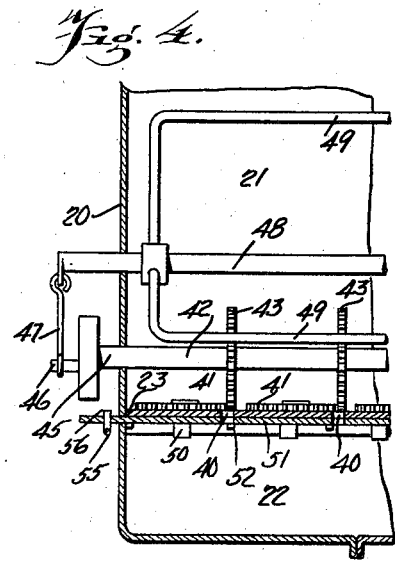
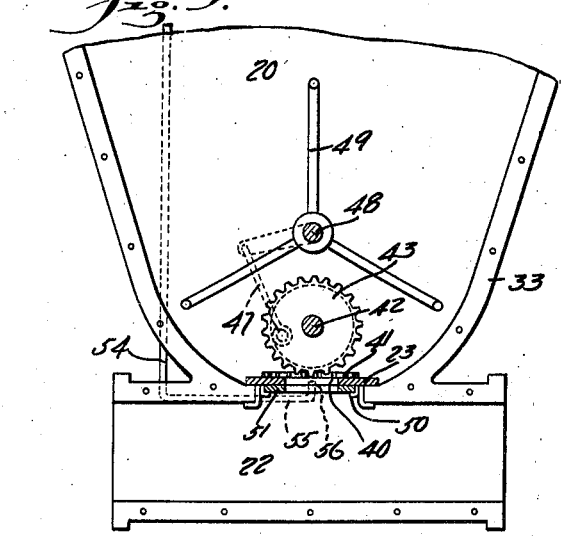
WITNESSES
INVENTOR
C. G. ALLGRUNN
BY
ATTORNEYS Patented May 15, 1923.

1,455,561

UNITED STATES PATENT OFFICE.

CARL G. ALLGRUNN, OF MIDDLEPORT, NEW YORK, ASSIGNOR TO NIAGARA SPRAYER CO., OF MIDDLEPORT, NEW YORK, A CORPORATION OF NEW YORK.

CROP-DUSTING MACHINE.

Application filed October 25, 1921. Serial No. 510,405.

*To all whom it may concern:*

Be it known that I, CARL G. ALLGRUNN, a citizen of the United States, and a resident of Middleport, in the county of Niagara and State of New York, have invented a new and Improved Crop-Dusting Machine, of which the following is a full, clear, and exact description.

The present invention relates to new and useful improvements in dusting machines for growing crops, and it pertains more particularly to a new and improved feeding hopper for such machines.

Machines of this character are employed for applying chemicals in powdered form to growing plants, and owing to the degree of fineness to which said chemicals are powdered, difficulty is experienced in feeding the chemicals to the discharge system.

It is one of the objects of the present invention to provide a hopper for carrying the chemicals, in which hopper a chemical feeding mechanism is employed.

It is a further object of the invention to provide a new and improved agitating mechanism within the hopper which serves to present the material to the feeding mechanism.

It is a further object of the invention to provide a feeding mechanism which may be adjusted or regulated in such a manner as to vary the quantity of chemical discharged from the hopper.

It is a still further object of the invention to so construct the adjusting mechanism that the hopper may be caused to discharge a predetermined quantity of chemical over a given area.

With the above and other objects in view, reference is had to the accompanying drawings, in which Figure 1 is a top plan view of a machine constructed in accordance with the present invention;

Fig. 2 is a side elevation thereof;

Fig. 3 is a horizontal sectional view taken on the line 3—3 of Fig. 2;

Fig. 4 is a detail sectional view;

Fig. 5 is a detail sectional view taken on the line 5—5 of Fig. 3.

Referring more particularly to the drawings, the device comprises a platform 10 carried by an axle 11, which in turn is mounted in traction wheels 12. The axle 11 carries a sprocket 13, and passing around said sprocket 13, is a chain 14. Mounted upon the platform 10 in bearings 15, is a shaft 16, said shaft carrying a sprocket 17 about which the chain 14 travels to drive the shaft from the sprocket 13. Interposed in the shaft 16, is a clutch 18 by means of which the shaft 16 is connected to and disconnected from the driving sprocket 13.

Mounted upon the platform 10, is a hopper 20, and said hopper 20 is divided into two compartments 21 and 22, by means of a partition or the like 23. Extending through this hopper 20, is a shaft 24, and mounted exteriorly of the hopper on the shaft 24, is a sprocket 25, about which a chain 26 passes. This chain also passes about a sprocket 27 carried by the inner end of the shaft 16. The shaft 24 extends through the hopper 20 and is provided on its other end, 28, with a pulley about which a belt 29 passes. This belt also passes about a pulley 30 carried by a shaft 31, and said shaft 31 extends into a fan blower or the like 32 of ordinary construction.

It is apparent from the above construction that when the clutch 18 is engaged, through the medium of the shaft 16, sprockets 25 and 27, chain 26, shaft 24, belt 29, and pulley 30, the fan 32 will be driven to provide the necessary air under pressure to carry out the dusting operation.

The hopper 20, as more clearly shown in Fig. 3, is composed of two sections 30 and 31, and said sections are secured together by suitable fastening means passing through flanges 33 formed in opposite sides of the sections 30 and 31. As heretofore mentioned, the partition 23 divides the hopper into two compartments 21 and 22, of which the upper chamber is the container for the material to be applied to the plants, and the lower chamber is the air chamber to which the fan or blower 32 heretofore mentioned delivers air under pressure.

Leading from the end of the compartment 22 opposite to the blower 32, is a plurality of discharge pipes 35, and carried by the end of each of these discharge pipes 35, is a branch coupling 36, from which extend discharge pipes 37. This part of the invention forms the subject matter of another application filed by myself and Edgar Knapp.

The partition 23 heretofore mentioned is provided with a plurality of openings 40 spaced with respect to one another, and mounted upon said partition is a plurality of toothed wheels 41, there being one wheel mounted adjacent each of the discharge openings 40 in such a manner that the teeth of said wheel pass directly over their respective opening for a purpose to be hereinafter more fully described.

Extending transversely of the hopper 21 is a shaft 42, and mounted upon said shaft 42 is a plurality of toothed wheels 43. The wheels 43 are so located upon the shaft 42 that they will engage the wheels 41 heretofore mentioned and serve as the means for rotating said wheels 41, the point of contact between the wheels 41 and 43 being directly over the discharge openings 40 of the partition 23. One end of the shaft 42 extends beyond the hopper 20 as indicated by the reference character 45, and mounted upon this projected end of the shaft 42 is an eccentric pin 46 connected by means of a link 47 to a shaft 48, which shaft 48 extends transversely of the hopper 20. Mounted upon the shaft 48 is a plurality of rigid agitating members 49, and upon oscillation of the shaft 48, the agitating arms 49 are rocked within the hopper to dislodge the powdered chemicals therein in order that there may be sufficient quantity at all times presented to the feed wheels 41.

Mounted in guides 50 below the partition 23, is a sliding plate 51, and said sliding plate 51 is provided with openings 52 adapted to be placed in register with the openings 40 of the partition 23 in order that the material may pass therethrough. This sliding plate is operated by means of a vertically-extending rod 54, the lower end of said rod being angularly disposed as designated by the reference character 55 in Fig. 5, and having its lower extremity provided with a right angular extension 56, which engages in an opening in the sliding plate 51. The upper end of this vertically extending rod 54 is provided with an operating handle 57 adjacent the driver's seat, which is shown in Fig. 1 and designated by the reference character 58.

The shaft 42 heretofore mentioned is driven by means of a belt or the like 60, and said belt passes around pulleys 61 and 62 carried by the shafts 16 and 42, respectively. These pulleys are of the stepped cone type, which construction permits of the speed of rotation of the shaft 42 being regulated with relation to the speed of the shaft 16 in order that the wheels 43 and the feeding wheels 41 may be driven in various speeds to provide for regulation of the quantity of chemical discharged from the hopper 20. By this means the speed of the feeding mechanism may be varied in order that a predetermined volume of chemical may be discharged over a given area.

The operation of the device is as follows: As the machine is drawn through the field in any suitable manner, the sprocket 13 serves through the medium of the chain 14, to drive the shaft 16. As the shaft 16 is driven, through the medium of the belt 60 and the pulleys 61 and 62, the shaft 42 will be rotated and the toothed wheels 43 will drive the feed wheels 41 in order that the material in the hopper may be discharged into the air space 22.

Simultaneously with this operation, the chain 26 serves to drive the shaft 24, and through the medium of the belt 29, the blower 32 will be operated as heretofore stated. The blower in its operation forces air under pressure through the chamber 22, where said air under pressure picks up the material discharged by the feed wheels 41, it being understood that the sliding plate 51 is positioned with its openings in register with the openings 40 of the partition 23, and discharges this dust-laden air through the discharge pipes 35 to the nozzles of the machine. As the shaft 42 is rotated, through the medium of the link 47, the shaft 48 will be oscillated and the agitating arms 49 will be caused to dislodge the chemical in the upper portion of the hopper 20, and present the same to the discharge wheels 41 in order that there may at all times be sufficient chemical at this point to be discharged into the air chamber 22.

By an adjustment of the belt 60 on the pulleys 61 and 62, the speed at which the feed rollers 41 are rotated may be changed in order that the volume of chemical discharged from the hopper to the air chamber 22 may be varied to meet different existing operating conditions.

I claim:

1. In a machine of the class described, a hopper having a plurality of discharge openings in its bottom wall, a plurality of toothed wheels so mounted with respect to said discharge openings that the teeth of said wheels overlie said discharge openings, a shaft extending through said hopper, and gears carried by said shaft for driving said wheels, as and for the purpose set forth.

2. In a machine of the class described, a hopper having a plurality of discharge openings in its bottom wall, a toothed wheel mounted adjacent each of said openings with its teeth overlying their respective openings, and a plurality of driving gears so arranged that one of said gears will mesh with each of the first-mentioned gears at a point directly over the discharge openings in the bottom wall, as and for the purpose set forth.

3. In a machine of the class described, a hopper provided with a plurality of discharge openings, a horizontal gear mounted adjacent each of said discharge openings with its teeth overlying its respective discharge opening, a plurality of vertical driving gears adapted to mesh with said horizontal gears at a point directly over said discharge openings, means for rotating said vertically-disposed gears, and an agitator mounted in the hopper and driven by the driving means of said vertically-disposed driving gears.

CARL G. ALLGRUNN.